March 15, 1966 D. SMITH 3,240,501
GASTIGHT GASKET JOINT
Filed April 17, 1964 3 Sheets-Sheet 1
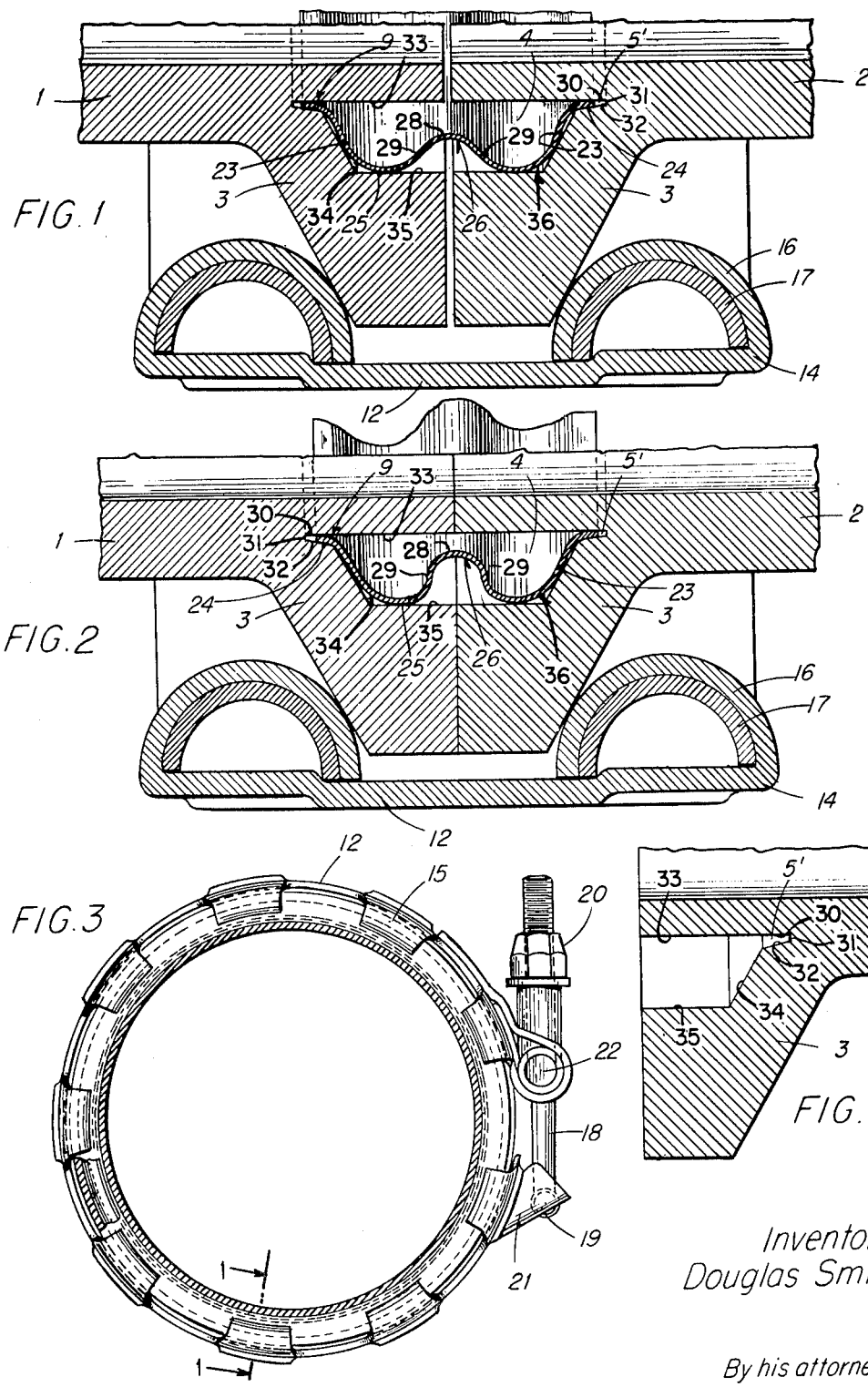
Inventor
Douglas Smith
By his attorneys

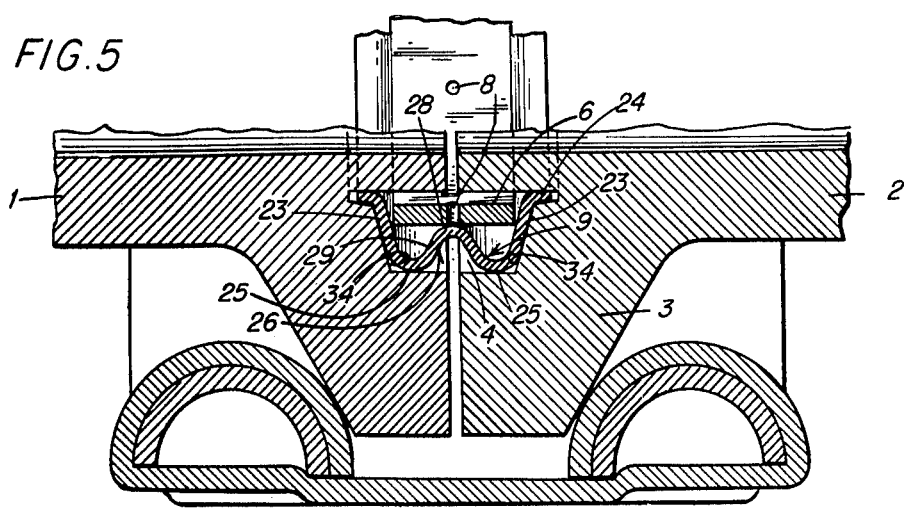
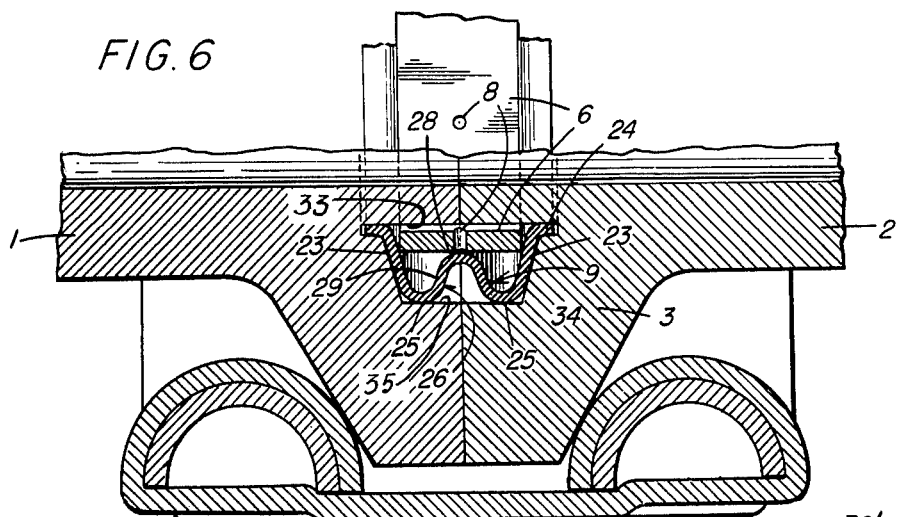
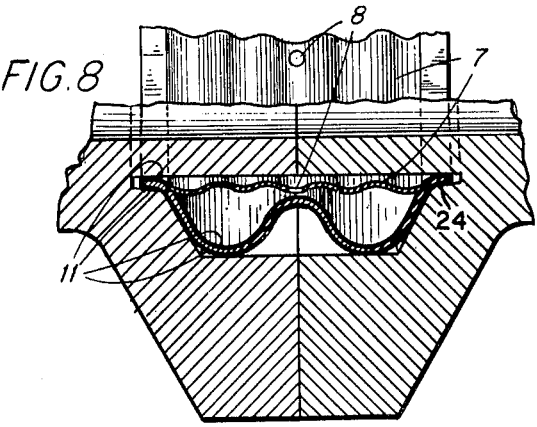
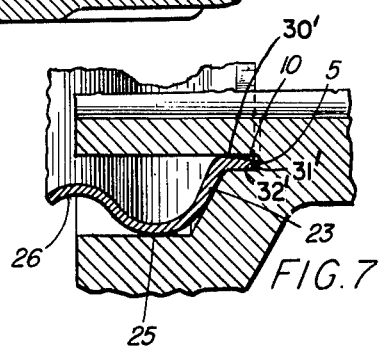

March 15, 1966 D. SMITH 3,240,501
GASTIGHT GASKET JOINT

Filed April 17, 1964 3 Sheets-Sheet 3

INVENTOR.
Douglas Smith
BY his attorneys

3,240,501
GASTIGHT GASKET JOINT
Douglas Smith, 30 Highland Ave., Rowayton, Conn.
Filed Apr. 17, 1964, Ser. No. 360,492
17 Claims. (Cl. 277—9)

This application is a continuation-in-part of my copending U.S. application Serial No. 256,876, filed Feb. 7, 1963, and now abandoned.

This invention pertains to pipe or conduit joint couplings with gasket seals, and more particularly to apparatus affording a fluid-tight sealing together of joints of mechanically coupled pipe lengths that are subjected to sudden and severe shocks from substances being conveyed through the pipe lengths.

It has heretofore been customary to use rings circular in cross-section, or hollow O-ring gaskets, to effect tight leakproof sealing together of pipe lengths coupled by means of flanges on the ends thereof with a clamp holding them together. Couplings of this nature are shown in my U.S. Patents 2,773,710 of Dec. 11, 1956, for Bimetallic Coupling for Flanged Pipe Fittings, and Reissue 24,589 of Jan. 13, 1959, for Bimetallic Coupling for Flanged Pipe Elements. These couplings are effective over wide variations in temperature, but are incapable of standing up under the extreme requirements of cryogenic, high vacuum, high temperature, nuclear, and high pressure applications. They do not perform satisfactorily when the substance passing through them undergoes sudden and greater pressure changes or shocks than heretofore experienced. Subjection of the conventional O-ring seal to such high-pressure shocks results in galling of the seal, subsequent failure thereof, and leakage through the joint in which it is installed. Flexible packing of the organic variety is unsuitable for extreme pressure-shock conditions, because such packing is either driven out of sealing position, or burst into pieces when the pipe lengths have a temporary gap between them due to pressure-shock. Metal gaskets having a U shape in cross-section have also been used without success. Kruesi U.S. Patent 1,493,269 shows one such design. Two fundamental deficiencies exist in gaskets of this general design. First the flexibility of the U member is limited and cannot provide sufficient compensation for the momentary gap between the pipes caused by a high-pressure-shock. In the second place, the amount of thrust exerted laterally by the edges of the U member is inadequate to provide the tight joint needed.

This invention provides a fluid-tight joint that will not only hold vacuums at least as low as $10^{-8}$ millimeters of mercury, but can also withstand pressure cycling up to many thousands of pounds per square inch, and back down therefrom repeatedly without leaking. The practice of having sealing means absorb thermal or pressure-shock at the point of seal has not heretofore been satisfactorily achieved.

The industry, therefore, has not up to now, had a seal that provides a satisfactory fluid-tight or leakproof joint between coupled pipe lengths which are subjected to high-pressure-shock operating conditions. For a seal to operate satisfactorily under such conditions, it must at least compensate for momentarily created gaps between the flanges of coupled lengths caused by pressure-shocks of many thousands of pounds per square inch. It must also maintain the joints perfectly fluid-tight i.e., leakproof even when subjected to such treatment. To do this, it is essential that the sealing surfaces of the joint remain stationary and do not move with respect to each other. Any movement between them will probably cause the gasket to leak. To keep these surfaces immovable with respect to each other it is essential that the gasket be adapted to expand resiliently along its longitudinal axis under a severe pressure shock so as to prevent the existence of any force which may tend to dislodge the gasket sealing surfaces when the pipe ends separate.

One object of this invention is to overcome the foregoing deficiencies of present pressure-sealing means, and to provide a fluid-tight pipe joint that will not leak under large and sudden pressure changes or shocks.

Another object of this invention is to provide a fluid-tight gasket seal for use under severe pressure-shock conditions which can resiliently expand with the pipe ends as they separate momentarily under severe pressure shocks from within the conduit and still provide a fully leakproof joint even after many such expansions and shocks.

Another object of this invention is to provide a fluid-tight gasket seal under the conditions noted above which is easily detachable from the conduit flanges and can be reused again and again.

Another object of this invention is to provide a gasket joint in which the sealing surfaces of the gasket remain immobile in their respective conduit ends even under pressure shocks sufficient to separate these ends momentarily.

Another object of the invention is to provide means for driving the edges of the gasket and appropriate distance into slots in the conduit ends as they are being connected together.

Another object of the invention is to provide means for guiding the gasket as the conduit ends are being connected and for facilitating removal of the gasket as they are being disconnected.

Various other objects and advantages will appear from the description of the invention hereinafter.

The heart of the invention lies in the provision of a unitary gasket seal which is annular in shape, with sealing surfaces which remain immobile in the ends of the conduit lengths, and which has a body portion capable of resiliently increasing its length along the longitudinal axis of the seal when subjected to such high pressure shocks from within the pipe as are sufficient to cause the conduit ends to separate momentarily. Even during the momentary separation of the conduit ends, the gasket prevents the escape of whatever substance is within the conduit.

In the drawings:

FIG. 1 is a plan view in cross-section of one side of two pipes mechanically coupled with the thermally variable bimetallic coupling described by my aforesaid patents and sealed with the novel gasket of the present invention, the pipes being shown with a gap therebetween, as if under stress.

FIG. 2 is a plan view in cross-section similar to FIG. 1, when there is no gap between the pipe ends, as if they had just been connected up.

FIG. 3 is a plan view partly in section across a pipe showing one of my new bimetallic couplings incorporated at a joint of said pipe.

FIG. 4 is a plan view in section on an enlarged scale showing the preferred form of slot in the gasket notch of one pipe end, in which slot an edge of the gasket is anchored according to my invention.

FIG. 5 is a plan view in cross-section of two pipe ends similar to FIG. 1, with the addition to the gasket of a straight spreader insert having circumferentially spaced pressure vents, with the pipe ends separated as if under stress.

FIG. 6 is a plan view in cross-section with the straight spreader insert and pressure vents associated with the gasket, with the pipe ends in contact as if they had returned to their original position after a pressure shock.

FIG. 7 is a plan view in section on an enlarged scale similar to FIG. 4 of an alternate form of slot and gasket edge.

FIG. 8 is a plan view in cross-section of one side of two pipe ends, a corrugated spreader insert having been substituted for the straight insert of FIGS. 5 and 6, and soft amalgam being plated on the gasket.

Figure 9:
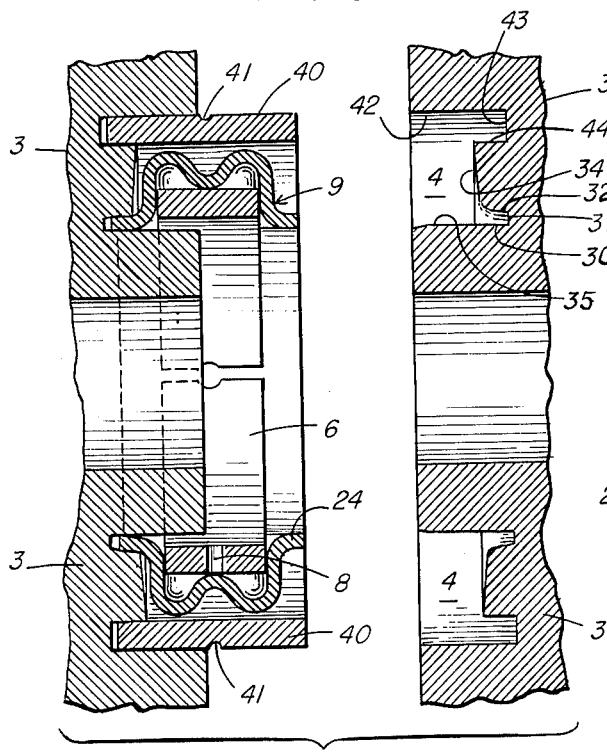
FIG. 9 is a vertical view in cross-section partially exploded, showing the manner in which the preferred form of the invention is connected up.

The invention includes a gasket comprising a unitary annular ring of metallic sheet material having a central body portion and end portions comprising edges. The body portion is corrugated along the longitudinal axis of the ring and has the shape of a continuous wave form with at least two ridges separated by a groove when seen in cross-section. The groove lies radially inwardly of the ridges, but radially outwardly of a cylindrical plane containing the end portions of the gasket. It is connected to the ridges via two side portions which extend from the bottom of the groove to the ridges with an acute angle between them having the general shape of a V when seen in cross-section. The edges of the gasket extend in opposite directions along the longitudinal axis, and have upper and lower sealing surfaces which are adapted to cooperate with the pipe or conduit ends to form a tight leakproof joint. The pipe ends which are adapted to receive the gasket have slots into which the gasket edges are placed, and at least one notch to contain the body portion of the gasket. In addition, the notch or notches support the ridges of the gasket against movement in a radially outwardly direction. The slots are designed to have a tapered wedge relationship to the gasket edges which are placed in them. This tapered wedge feature provides a double seal in each slot while keeping the gasket sealing surfaces immovably anchored and protected from accidental scratching or injury which might cause them to leak.

When the gasket is in an operating position, its edges have been driven an appropriate distance into the slots. This distance is great enough so that the body portion of the gasket lying between the edges and the ridges for the most part lies tightly against the walls defining the ends of the pipe end notch or notches. When the joint is initially connected up, there may be a slight air gap between the outer legs of the gasket and the wall defining the end of the notches near where the gasket edges enter the slots. This is not harmful however, because the first severe pressure shock will flatten these legs against the end wall of the notch thereby eliminating the air gap. Though this movement may tend to drive the edges further into the slots, such movement only has the effect of making a tighter seal. The natural resilience of the gasket after the passage of a severe pressure shock is incapable of moving the edges once they have been driven fully into the slots. They are too tightly wedged in position. In this fully driven position, however, the edges are still spaced a distance from the walls defining the ends of the slots. This space is needed for maintaining a tight seal. The tapered wedge relationship of the slots and the gasket edges keeps these edges immovably anchored in position. No sudden increase in pressure from within the pipe can dislodge them. Instead, such a pressure increase will act to insure that the edges remain immovably anchored. Such increased pressure, will, as mentioned above, only urge the outer legs of the body portion of the gasket, more tightly against the walls defining the ends of the notch or notches. This, in itself, tends to keep the edges of the gasket immovable in their slots.

To maintain this condition under repeated sudden pressure increases which are great enough to cause the pipe ends to separate momentarily, the groove of the gasket has been formed in a generally V shaped configuration with its bottom lying radially outwardly of a cylindrical plane containing the edges of the gasket. With this configuration, the wall portions or side portions of the groove connect its bottom to the ridges. These side portions are put in a state of compression as the pressure increases. This compression force is transferred to the ridges through the groove side portions in two components, one of which is radially outwardly, the other being along the longitudinal axis of the gasket. The components of force along the longitudinal axis of the gasket tends to separate the ridges so that when the pressure increase is sufficient to separate the pipe ends momentarily, the ridges will also separate following the movement of the pipe ends thereby keeping the specified body portions against the walls defining the ends of the notches. This, in turn, of course, prevents any dislodging force from reaching the gasket edges permitting them to remain tightly and immovably anchored in the slots of the pipe ends. When the pressure within the pipe returns to normal the clamp or bolting arrangement holding the pipe ends together returns these ends to their original position. The gasket also returns to its original position and configuration. The force of the bolt or clamp arrangement holding the pipe ends together is so much greater than the tendency of the gasket to return to its normal configuration, that there is no tendency for the gasket to pull away from the walls defining the ends of the notches even when the pressure suddenly reduces to zero or below.

As mentioned hereinbefore, in connecting the gasket with the pipe ends, it is essential that the edges of the gasket get driven an appropriate distance into the slots. When using gaskets with an internal diameter of say for example ½ an inch, the stiffness of the metal of which the gasket is made is sufficient to initially accomplish this function. With larger gaskets such as those having an internal diameter of for example, two inches or more, the force needed to drive the edges into their slots is much greater, and it is necessary to provide separate means for driving the edges into the slots. This is done by providing a spreader insert between the gasket edges. Such an insert provides adequate force for driving the edges into their respective slots.

The insert comprises a flat metal ring which is preferably rectangular in cross-section and which has two unconnected ends which can be slipped past one another to reduce the diameter of the ring so as to facilitate its being placed in position between the gasket edges. The spreader need not be flat and rectangular in cross-section, but may be corrugated along its longitudinal axis in the shape of a continuous wave form or in any other configuration which enables it to drive the gasket edges an appropriate distance into the slots. Though a corrugated spreader is more expensive to manufacture than one which is rectangular in cross-section, it has a certain resilience along the longitudinal axis of the gasket which tends to prevent its edges from being driven too far into the slots. This is a useful feature when the manufacturing of the spreader cannot be held to as close tolerances as desirable, because it prevents the edges from being overdriven into their slots. The shape of the spreader when seen in cross-section, may also be concave with its radially outer portion resting on the groove bottom its edges extending longitudinally and radially inwardly from there to the gasket edges. A spreader is generally provided with a series of holes along its periphery in order to allow changing pressure on the interior of the spreader to equalize itself with that on the exterior side. Once the spreader has performed its initial function of driving the gasket edges into their slots it serves no further purpose. Momentary separation of the pipe ends due to a sudden increase in pressure leaves the spreader still between the edges of the gasket but no longer touching them. Thus, it no longer affects the ability of the gasket edges to keep the joint leakproof. Of course, when a pressure surge has passed and the pipe ends come back together, the spreader once again abuts and supports the gasket edges in position in their slots.

The preferred embodiment of the invention includes one further feature which facilitates the assembly and disassembly of the gasket joint. Instead of having the radially outer wall of the notch or notches support the ridges of the gasket against radially outward movement, a back-up ring is provided which performs the same function. This back-up ring also acts as a pilot ring which aids in positioning the gasket during assembly of the joint, but more importantly, it simplifies the problem of removing the gasket after use when the joint is being disassembled. The back-up ring comprises a flat metal ring which is preferably rectangular in cross-section and which is greater in all its dimensions than the previously mentioned spreader. It preferably is not unitary but has two unconnected ends, the purpose of which will be described more fully hereinafter. It also preferably has at least two slots cut into opposite portions of the outer periphery of the ring for accommodating the tip of a screwdriver or other like instrument. These slots may extend circumferentially a distance around the ring and are preferably placed at convenient distances from the edges of the ring to enable the tip of a screwdriver to pry it loose from the pipe ends when the joint is being disconnected. The usefulness of the back-up ring lies in the fact that without it, after a gasket ring has been used and subjected to several sudden pressure shocks, it is quite difficult to remove the gasket from the pipe ends without damaging it in some way.

Apparently, though before use, the gasket ring fits inside the back-up ring quite easily, after use, this is no longer true. The sudden pressure shocks subject the gasket to large sudden increases in pressure which apparently expand it beyond its elastic limits so that when the pressure surge has passed the gasket ring does not return to its original size but remains tightly wedged against the back-up ring. The use of a screwdriver in the slots of a back-up ring provides the force necessary to pull the gasket edges from their slots without damaging them, and then to remove the back-up ring with the gasket ring in it as one unit. Of course, when a back-up ring is used the notch or notches in the pipe end will contain a special section for receiving it. This facilitates connecting the joint up again because this notch portion guides the back-up ring to its proper position and likewise guides the gasket ring surrounded by the back-up ring. The back-up ring has slightly rounded edges to aid this piloting or guilding function and as mentioned above, is preferably not unitary but cut at one point so as to facilitate removal of the gasket ring from it once the combination is removed from the pipe ends. This may be done by inserting a screwdriver between the ends of the back-up ring and twisting it to temporarily increase its diameter. Both the insert and the back-up ring are preferably made of a corrosion resistant steel such as stainless steel. They may also be made of other corrosion resistant metals. The spreader may even possibly be made of aluminum.

For a more detailed explanation of the invention, reference will now be made to the drawings. In FIGS. 1 and 2 pipe ends 1 and 2, respectively, are shown connected and sealed together using a gasket 9 constructed in accordance with the invention. A flange 3 is integral with each pipe end and has spaced walls 30, 31 and 32 defining tapered slots 5′, and spaced walls 33, 34 and 35 defining notches 4. The gasket seal 9 is shown contained in these slots and notches.

Gasket seal 9 comprises a body portion 36 and two rectangular edges 24 comprising its end portions. Body portion 36 comprises two ridge portions 25 separated by a groove portion 26 together with outer leg portions 23 connecting the ridges with the edges 24. Groove portion 26 comprises a bottom 28 and two side portions 29 connecting the groove bottom with the ridges 25. Body portion 36 has the shape of a continuous wave form with side portions 29 generally forming a V shape and having an acute angle included between them beginning at the groove bottom 28. Groove bottom 28 is at all times radially outwardly of the cylindrical plane containing notch defining walls 33. The ridges 25 are supported by the notch defining walls 35 against radially outward movement. Outer leg portions 23 lie tightly against and are contiguous with notch defining walls 34.

Also shown in FIGS. 1 and 2, is a section of a coupling clamp 12 designed to keep the pipe ends 1 and 2 connected together. Any suitable coupling may be used for this purpose whether it be of the bolted flange type or thermally variable type. The coupling clamp 12 shown by way of example in FIGS. 1, 2, 3, 5 and 6, is a bimetallic coupling described and disclosed in my hereinbefore mentioned patents. It is shown in plan in FIG. 3 and comprises a circular band 14, a series of bimetallic retainers 15 which in themselves comprise curled lugs 16 and curled inserts 17; a T-headed bolt 18 having a T-head 19; and self-locking nut 20 connected to the circular band by a cross-head 22 and socket 21.

FIG. 1 shows the gasket 9 in a flexed configuration as if the joint were undergoing a severe pressure shock sufficient to separate the pipe ends momentarily. This greatly increased pressure has forced the groove bottom 28 radially outwardly a distance thereby increasing the angle between the groove side portions. This, in turn, has separated the ridges 25 a distance and kept the outer leg portions 23 tightly against notch defining walls 34. In FIG. 2 the joint is seen in its more normal condition with the pipe ends together before a severe pressure shock has occurred. In this condition, groove portion 28 lies radially inwardly of its flexed position and ridges 25 are in their unflexed position with a narrower generally V shaped acute angle between them. Outer leg portions 23 still remain tightly against notch defining walls 34 except for a slight air gap near the edges which disappears with the first pressure shock.

FIG. 4 shows an enlarged detail of the slot structure in its preferred form. Slot defining walls 30, 31 and 32 are shown with wall 32 being tapered with respect to wall 30. When the rectangular edges 24 of the gasket 9 shown in FIGS. 1 and 2 are inserted an appropriate distance into these slots, a double seal is achieved. Upper slot defining wall 30 forms a seal with one of the sealing surfaces on gasket edges 24 and lower slot defining wall 32 forms a seal with the second sealing surface of edges 24. These sealing surfaces are preferably plated with a soft sealing amalgam to increase their sealing ability. The combination of a tapered slot structure with the rectangular edge 24 creates a tapered wedged or locking effect which, particularly when used with the soft amalgam, provides a firmly anchored leakproof joint with a double seal in which the wedge fitted edges 24 are maintained immovable. The immovability of the edges 24 in slots is an important feature for it prevents the sealing surfaces from being galled as they would be if the edges were permitted to move in the slots. When a sealing surface becomes galled it is no longer leakproof. To avoid this, the gasket edges 24 are maintained immovable in the slots.

Now referring to FIGS. 5 and 6, the use of a spreader 6 as part of the invention, will be explained. FIG. 5 shows the pipe ends 1 and 2 separated momentarily as if by a sudden pressure shock while FIG. 6 shows them returned again to their non-pressurized location and condition. The gasket 9 of FIG. 5 is shown in the same general condition as in FIG. 1 with the groove bottom moved a distance radially outwardly and the groove side portions 29 spread apart at a somewhat greater angle so that the ridges 25 are separated further than in FIG. 6. The outer leg portions 23 lie tightly adjacent notch defining walls 34 described in connection with FIG. 1. The principal difference between FIGS. 1 and 2 and FIGS. 5 and 6 lies in the addition of a spreader 6 between the gasket edges 24. As shown in FIG. 5, the spreader 6 is out of contact with the edges 24 and outer legs 23 of gasket 9. It rests completely free in the chamber enclosed by the gasket except for the support given to it by the bottom 28 of the groove 26. As shown in FIG. 6, when the pipe ends, flanges and gasket have returned to their normal positions the spreader once again lies tightly between the edges 24 giving them support and preventing them from being pulled out of the slots. A series of holes 8 may be drilled through the spreader 6 so as to equalize the pressure on its radially inner and outer surfaces.

FIG. 8 shows a spreader 7 which is corrugated in cross-section and which may be used in place of the flat spreader shown in FIGS. 5 and 6. As mentioned before, except for the fact that the corrugated spreader urges the edges 24 into the slots with a resilient force rather than an unyielding force as with the flat spreader 6, there is no difference in function between the two different types. As with the flat spreader 6, a series of openings 8 may also be drilled through the corrugated spreader 7 so as to equalize the pressure on both sides of it. FIG. 8 also shows a layer of soft amalgam plating 11 which has been added to the gasket 9 to increase the sealing ability of gasket edges 24.

An enlarged detail of a different slot and edge construction is shown in FIG. 7. In this embodiment the gasket 9 has a ridge 25, a groove 26 and outer leg portions 23, but tapered edges 10 rather than rectangular edges 24. In addition, the flanges 3 have rectangular slots 5 instead of tapered slots 5'. Rectangular slots 5 are defined by slot defining walls 30', 31' and 32'. This construction of the slots and edges still gives the tapered wedge relationship which is used to anchor the edges. It is an important feature of the invention which when used in conjunction with the soft amalgam plating, develops a leakproof double seal joint in which the edges are held immovable.

Figure 10:
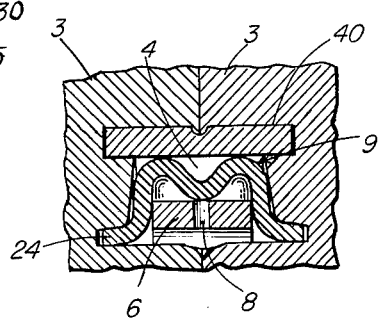
FIG. 10 is a vertical view in cross-section showing the preferred embodiment of the invention in its normal condition when connected up to form a leakproof joint.
Figure 11:
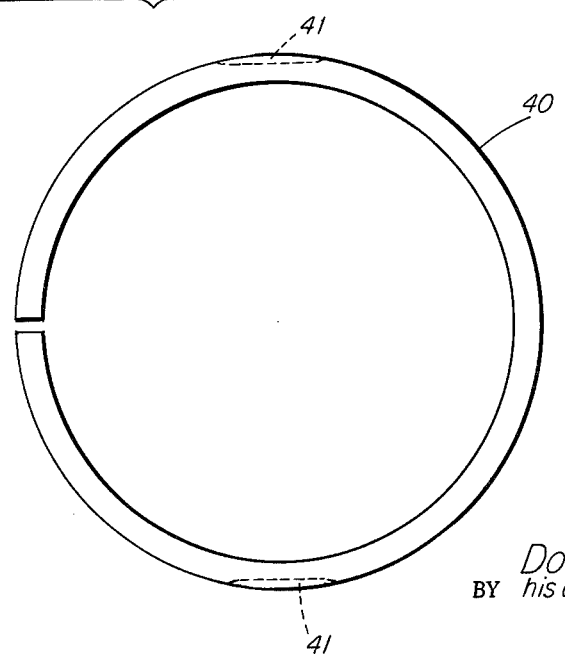
FIG. 11 is a view in vertical section of the back-up ring according to the invention, which is shown in cross-section in FIGS. 9 and 10.

Now referring to FIGS. 9, 10 and 11, the back-up plate feature of the invention can be seen in detail. These figures represent the preferred embodiment of the invention. FIG. 9 shows the gasket 9 together with the spreader 6 in position between the rectangular edges 24 together with a back-up plate 40 which loosely surrounds the gasket ring and spreader combination. Back-up plate 40 as shown in FIG. 11, comprises an annular metal ring which may be formed from a piece of sheet steel and rolled into a ring shape with its two ends adjacent one another but separated as shown. The plate 40 is rectangular in cross-section though it could perfectly well be trapezoidal or of any other shape that would allow it to perform its functions properly. Slots 41 may be cut circumferentially at opposite points in back-up plate 40 to facilitate removal of the plate from the flanges 3. As pointed out hereinbefore, there may be more than two such slots according to the needs of the particular application. In this embodiment of the invention, flanges 3 have a recess defined by walls 42, 43 and 44, respectively. This recess is adapted to contain the back-up plate 40 so that when it is in position as shown in FIG. 10, the notches containing the gasket ring are defined by notch defining walls 34 and 35 and by the bottom of back-up plate 40. In all other respects, this embodiment of the invention is similar to that shown in FIGS. 5 and 6. The operation is similar to that of those figures except that when it is desired to separate the flanges for the purpose of disconnecting the joint, one flange is first separated from the gasket ring and then screwdrivers or similar instruments may be inserted in back-up plate slots 41 to remove the edges of the gasket seal from the slots in the other flange. In this way, the back-up plate 40 is removed together with the gasket seal 9 and spreader 6 as an integral unit. Insertion of the screwdriver into the slightly separated ends of the back-up plate 40 with a slight twist is sufficient to separate the gasket 9 from the back-up plate after both have been removed completely from the flanges. The gasket ring 9 may be reused again and again as long as its sealing surfaces are not scratched or otherwise injured. The fact that the slots are formed inside the flanges helps to keep the gasket from being injured.

A comprehensive series of tests using gaskets and spreaders in accordance with the hereinbefore described structure but without the back-up ring, have been carried out and give a good indication of the phenomenal capabilities of the invention. Satisfactory cycling tests have been run on this system at temperatures from $-320°$ F. to $1000°$ F. at pressures of 2,000 lbs. per square inch without leakage. Gas pressures down to $10^{-8}$ millimeters of mercury and beyond and hydraulic pressures up to 24,000 lbs. per square inch and shock pressures of 5,000 lbs. per square inch for better than 5,000 cycles have not produced leaks in the system. The gaskets used during these tests had a thickness of approximately .025 of an inch. They were made of Inconel X which is a suitable metal for the requirements and objects of this invention. Other materials, however, may be quite as satisfactory. Inconel X is a trademark for a wrought alloy containing approximately 73% nickel, 15% chrominum, $9/_{10}$ of 1% aluminum and $2½$% titanium and $85/_{100}$ths percent columbium. The gasket can be used with or without annealing after it has been formed, but an annealed and subsequently heat treated gasket is preferably for extreme high pressure shock conditions. The annealing removes strains of the forming operations, while the heat treating increases tensile strength and elasticity. Using a gasket with a 2¾ inch internal diameter observed pressure shocks have caused the flange faces to separate as much as .060 inch with no leakage. It is believed that using the back-up plate the gasket will remain leakproof at pressures considerably in excess of those already reached. As far as vacuums are concerned, though the ambient pressure outside a gasket under a high vacuum will tend to urge the ridges and grooves radially inwardly, the 15 pounds atmospheric pressure does not have a significant effect in this regard and is incapable of moving the edges from their fixed positions in the slots.

It will be understood that various changes in the details, materials, steps and arrangment of pairs which have been herein described and illustrated in order to explain the nature of the invention, may be made by those skilled in the art within the principle and scope of the invention as herein expressed.

What I claim is:

1. A gasket comprising a unitary annular ring of metallic sheet material, the body portion of said ring being corrugated along the longitudinal axis of the ring and having the shape of a continuous wave form, axial end portions of the ring lying parallel to said axis, extending in opposite directions and disposed at a radially inwardly portion of the body of the ring, said corrugations comprising at least two ridges extending radially outwardly beyond the end portions and at least one groove separating said ridges and lying radially inwardly of them but radially outwardly of a cylindrical plane containing said end portions, said groove having a bottom and two side portions which latter generally form a V shape when seen in cross-section beginning at the groove bottom each of said end portions having two sealing surfaces comprising a radially inner sealing surface and a radially outer sealing surface and a third surface comprising an axial end surface joining said two sealing surfaces.

2. A gasket according to claim 1, wherein the axial end portions of the ring comprise edges having two sealing surfaces which are coated with a soft amalgam.

3. A gasket according to claim 2, wherein the two sealing surfaces are parallel to each other.

4. A gasket according to claim 2, wherein one of the sealing surfaces is tapered with respect to the other.

5. A device according to claim 2, wherein there is additionally provided a spreader insert, between the edges of the gasket, comprising an annular ring of metal which is split at one point so as to form two ends which lie adjacent one another.

6. A gasket according to claim 5, wherein the spreader insert is flat and thicker than the metal from which the gasket ring is made and which contains a plurality of spaced openings through the insert around its periphery from inside to outside.

7. A gasket according to claim 5, wherein the spreader insert is corrugated along its longitudinal axis and which contains a plurality of spaced openings through the ring around its periphery from inside to outside.

8. A device according to claim 5, wherein there is additionally provided a back-up ring circumferentially surrounding the gasket ring and spreader insert to act as a pilot and to support the ridges of the gasket ring against radially outward movement.

9. A gasket according to claim 8, wherein the back-up ring comprises an annular ring of metal which is split at one point so as to form two ends which lie adjacent one another and which has rounded edges and at least one slot cut circumferentially a short distance into it.

10. A metal gasket seal and two conduit end members cooperating with said seal to provide a tight joint between conduits which are to be connected together, said gasket seal comprising a unitary annular ring of metallic sheet material, the body portion of said ring being corrugated along the longitudinal axis of the ring and having the shape of a continuous wave form, axial end portions of the ring lying parallel to said axis, extending in opposite directions and disposed at a radially inwardly portion of the body of the ring, said corrugations comprising at least two ridges extending radially outwardly beyond the end portions thereof and at least one groove separating the ridges and lying radially inwardly of them but radially outwardly of a cylindrical plane containing said end portions, said groove having a bottom and two side portions which generally form a V when seen in cross-section beginning at the bottom of the groove, said end members each having three spaced walls defining slots extending circumferentially into said end members parallel to said longitudinal axis, said gasket seal end portions having a tapered wedge sealing engagement with two of the walls defining said slots and being immovable therein, there being outer leg portions of the body of the gasket which extend from the edges to the ridges and rest tightly against the end members, the ridges of the gasket seal being supported against radially outward movement by at least one of said end members.

11. A metal device according to claim 10, wherein there is additionally provided a spreader insert, between the end portions of the gasket, comprising an annular ring of metal which is split at one point so as to form two ends lying adjacent one another, said end portions comprising edges having two sealing surfaces which are plated with a soft amalgam to cooperate with said slots and form a leakproof seal therewith.

12. A metal device according to claim 11, wherein the sealing surfaces of the edges are parallel to each other and the spreader insert is flat, thicker than the metal from which the gasket ring is made, and which contains a plurality of spaced openings through the insert around its periphery from inside to outside.

13. A metal device according to claim 11, wherein there is a back-up ring additionally provided which circumferentially surrounds the gasket seal and spreader insert, there being spaced walls in the end members to accommodate said back-up ring which supports the gasket seal ridges against radially outward movement and which facilitates removal of the gasket seal from the end members as well as its assembly with them.

14. A metal device according to claim 13, wherein the back-up ring comprises an annular ring of metal which is split at one point so as to form two ends which lie adjacent one another and which is rectangular in cross-section and has at least one slot cut circumferentially into it a distance sufficient to enable a tool to remove the back-up ring from the end members.

15. A metal device according to claim 14, wherein the end members comprise flanges, the body portion of said gasket seal has a plurality of ridges separated by grooves, and wherein at least one of the flanges have spaced walls defining a recess for containing the gasket seal and spreader insert.

16. A gasket according to claim 5, wherein the spreader insert ring is arcuate when seen in cross-section and which contains a plurality of spaced openings through the ring around its periphery from inside to outside.

17. A gasket according to claim 16, wherein said spreader is concave when seen in cross-section, its radially outer portion lying adjacent the groove bottom.

References Cited by the Examiner

UNITED STATES PATENTS

| | | | |
|---|---|---|---|
| 1,695,995 | 12/1928 | Coulston | 277—236 |
| 2,641,381 | 6/1953 | Bertrand | 277—236 |
| 3,012,802 | 12/1961 | Waite | 285—363 |
| 3,118,693 | 1/1964 | Wallace | 277—205 |

FOREIGN PATENTS

| | | |
|---|---|---|
| 614,140 | 6/1935 | Germany. |
| 527,363 | 10/1940 | Great Britain. |

LAVERNE D. GEIGER, *Primary Examiner.*

EDWARD V. BENHAM, LEWIS J. LENNY, *Examiners.*

E. W. DOWNS, S. ROTHBERG, *Assistant Examiners.*